United States Patent [19]

Tateishi et al.

[11] Patent Number: 5,721,580
[45] Date of Patent: Feb. 24, 1998

[54] LASER DIODE DRIVING APPARATUS IN AN OPTICAL INFORMATION RECORDING AND REPRODUCING APPARATUS

[75] Inventors: Kiyoshi Tateishi; Junichi Furukawa, both of Tsurugashima, Japan

[73] Assignee: Pioneer Electronic Corporation, Tokyo, Japan

[21] Appl. No.: 537,492

[22] Filed: Dec. 27, 1995

[30] Foreign Application Priority Data

Jan. 6, 1995 [JP] Japan ................................ 7-000551

[51] Int. Cl.⁶ ...................................... B41J 7/47
[52] U.S. Cl. ...................................... 347/246
[58] Field of Search ................... 347/246, 247, 347/236, 237

[56] References Cited

U.S. PATENT DOCUMENTS 4,803,497  2/1989  Kennedy, Jr. et al. ................ 347/246
5,216,443  6/1993  Thornton et al. ..................... 347/254

*Primary Examiner*—Mark J. Reinhart
*Attorney, Agent, or Firm*—Morgan, Lewis & Bockius LLP

[57] ABSTRACT

Disclosed is a laser diode driving apparatus in a optical information recording and reproducing apparatus by which the bottom power of a laser beam for the information recording and reproducing may be maintained stably at a target value. A bottom power corrected value is obtained by multiplying the peak power of a laser beam for the information recording by a predetermined coefficient. Then, the bottom power corrected value is added with a target bottom power to set the summed value as a corrected target bottom power. The bottom level of an optical power detection signal is subtracted from the corrected target bottom power to provide the remaining value as an error signal. The bottom power of the laser beam is adjusted on the basis of the error signal.

3 Claims, 5 Drawing Sheets

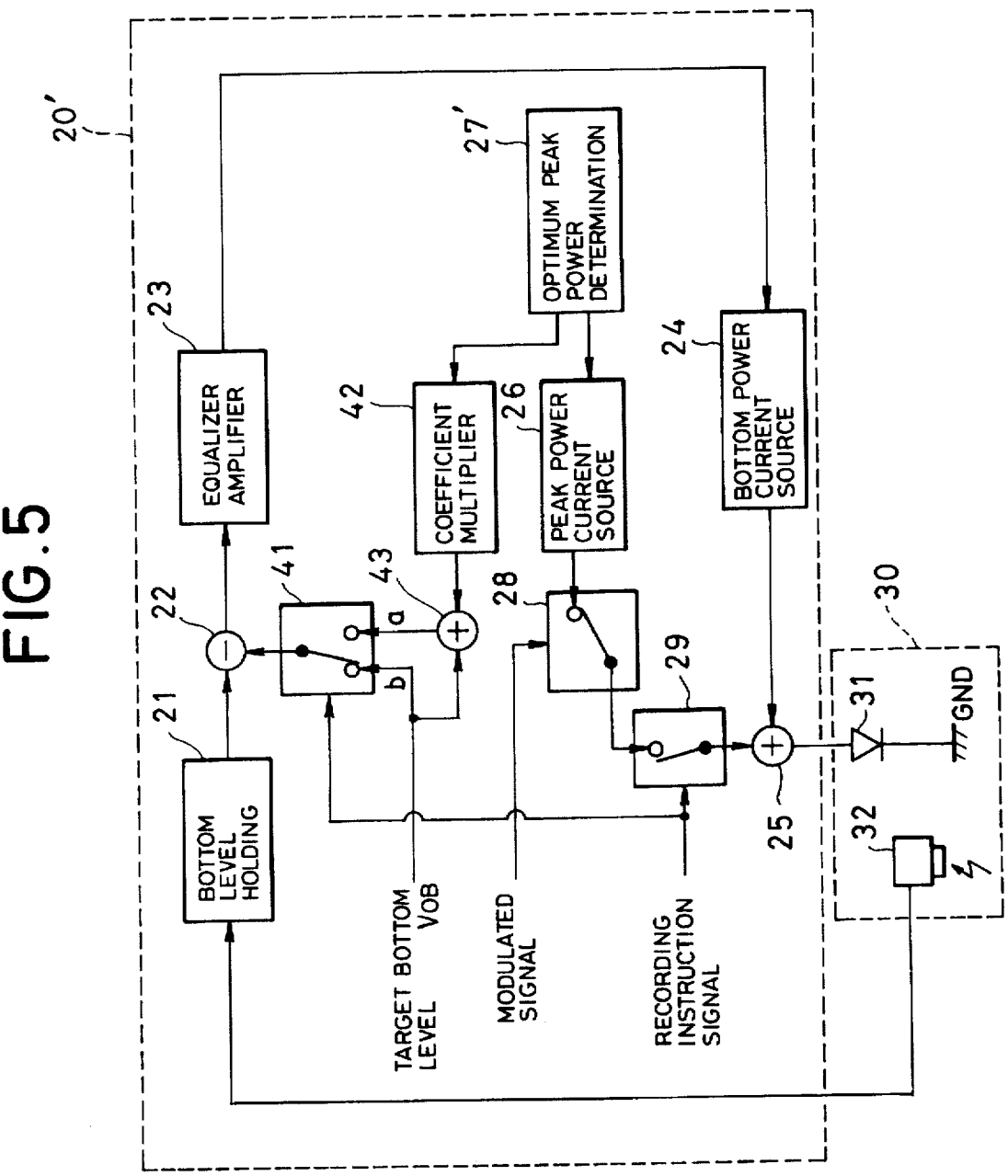

LASER DIODE DRIVING APPARATUS IN AN OPTICAL INFORMATION RECORDING AND REPRODUCING APPARATUS

BACKGROUND OF THE INVENTION

1. Field of the Invention

This invention relates to a laser diode driving apparatus in an optical information recording and reproducing apparatus.

2. Description of the Related Background Art

An optical information recording and reproducing apparatus is commonly manufactured, which records information on an erasable and rewritable optical disk, and reproduces the information recorded on the optical disk.

FIG. 1 is a schematic diagram showing a recording system in such an optical information recording and reproducing apparatus.

In FIG. 1, a modulating circuit 10 EFM (eight-to-fourteen) modulates information signals being recorded on an optical disk 40, and then supplies the EFM modulated signals to a laser diode (LD) driving circuit 20.

The LD driving circuit 20 receives the modulated signal to produce the specific amount of laser diode (LD) driving current corresponding to the level of the modulated signal, and then supplies the LD driving current to a laser diode (LD) 31 which has been provided within a recording and reproducing head 30. The bottom-level of the driving current is adjusted to equal to a predetermined target bottom level on the basis of an optical power detection signal which is supplied from a front monitoring diode (FMD) 32 described below.

The LD 31 generates a laser beam which has the optical power corresponding to the amount of the laser diode driving current to irradiate the laser beam on the optical disk 40. The information may be recorded on the optical disk 40 on the basis of the amount of the optical power in the irradiated laser beam.

The recording and reproducing head 30 includes the LD 31 and the FMD 32. Light emitted from the LD 31 is divided into two beams by a beam splitter (not shown). One of the beams is directed towards the optical disk to illuminate it. The other beam illuminates a photo detector (FMD 32) for monitoring the output power of the LD 31. The optical power on the disk can be estimated by examining the output current of the detector (FMD 32) because it is proportional to the output current. The FMD 32 then detects a part of the light divided by the beam splitter, and supplies an optical power detection signal which has the level corresponding to the optical power of the leak light to the LD driving circuit 20.

The next description will be made for the operation of the LD 31 and the FMD 32 in conjunction with FIG. 2.

As shown in FIG. 2, when a modulated signal supplied from the modulating circuit 10 has the logical value "0", the LD 31 irradiates a laser beam which has an optical power i.e. a bottom power $P_B$ corresponding to the lower limit level thereof onto the optical disk 40. Conversely, when a modulated signal supplied from the modulating circuit 10 has the logical value "1", the LD 31 irradiates another laser beam which has another optical power i.e. a peak power $P_p$ corresponding to the upper limit level thereof onto the optical disk 40.

In this case, if an optical power irradiated on the optical disk equals to the bottom power $P_B$ which has a level less than a predetermined threshold, the information corresponding to the logical value "0" may be recorded on the optical disk 40. If an optical power irradiated on the optical disk equals to the peak power $P_p$ which has a level more than a predetermined threshold, the information corresponding to the logical value "1" may be recorded on the optical disk 40.

It should be noticed that the bottom power $P_B$ has a level which is lower than the predetermined threshold but has enough level to cause a focus servo system (not shown) to operate normally.

Then, the LD driving circuit 20 of FIG. 1 always functions to hold the bottom power $P_B$ of the LD 31 at a target bottom power $P_{OB}$ by servo-controlling the laser diode driving current which is supplied to the LD 31.

FIG. 3 is a diagram showing the LD driving circuit 20 including a servo control circuit for servo-controlling the laser diode driving current, and the recording and reproducing head 30.

Referring to FIG. 3, a bottom-level holding circuit 21 within the LD driving circuit 20 detects and holds the bottom-level of an optical power detection signal received from the FMD 32, and then supplies the detected bottom-level as $V_B$ to a subtracter 22.

The subtracter 22 subtracts the detected bottom-level $V_B$ from a target bottom-level $V_{OB}$ which is fixed, and then supplies the signal corresponding to the remaining value as an error signal to an equalizer amplifier 23. The equalizer amplifier 23 compensates the phase of the error signal, and then supplies the resultant compensated error signal to a bottom power current source 24. The bottom power current source 24 adds a predetermined basic bottom level and the level of the compensated error signal to generate the specific amount of bottom power current which has the level corresponding to the resultant summed value, and then supplies the bottom power current to an adder 25.

A peak power current source 26 receives a peak power signal from an optimum peak power determining circuit 27 described below to generate the specific amount of peak power current corresponding to the peak power signal, and then supplies the peak power current to an input terminal of a switch 28. The optimum peak power determining circuit 27 determines an optimum peak power in the laser beam being irradiated on the optical disk 40, before information signals are recorded on the optical disk 40.

In one example, the optimum peak power determining circuit 27 initially records plurality of information signals for determination on the optical disk 40, varying incrementally or decrementally the level of a peak power signal supplied to the peak power current source 26. Then, the reproduction of the information signal for determination is executed, so that the best reproduced information signal which is reproduced most accurately is found out. The optimum peak power determining circuit 27 determines that the level of the peak power signal which had been supplied to the peak power current source 26 when the best reproduced signal was recorded is set as a optimum peak power.

In other words, the optimum peak power determining circuit 27 is capable of determining the optimum peak power depending on the characteristics of each of the optical disks, and then the initial conditions for the LD driving circuit 20 may be set so as to record information using the optimum peak power.

The optimum peak power determining circuit 27 also subtracts the basic bottom level, which is preset within the bottom power current source 24, from an optimum peak power signal corresponding to the determined optimum peak power, and then supply a signal corresponding to the remaining value as a peak power signal to the peak power current source 26.

The switch 28 is turned on when a modulated signal supplied to its switching controlling terminal has the logical value of "1", while the switch 28 is turned off when the modulated signal has the logical value of "0". In other words, the switch 28 supply the peak power current from the peak power current source 26 to a subsequent switch 29 only when a modulated signal received at its switching controlling terminal has the logical value of "1".

The switch 29 is turned on when an instruction signal received at its switching controlling terminal has the logical value of "1", while the switch 29 is turned off when the instruction signal has the logical value of "0". In other words, the switch 29 supplies the current from the switch 28 to the adder 25, only when an instruction signal received at its switching controlling terminal has the logical value of "1". It should be noticed that the instruction signal is supplied from a CPU (central processing unit; not shown) for controlling all of the operations within the optical information recording and reproducing apparatus. In a recording mode in which the optical information recording and reproducing apparatus functions to record information on an optical disk, the CPU generates an instruction signal of the logical value "1". In a reproducing mode in which the apparatus functions to reproduce information recorded on an optical disk, the CPU generates another instruction signal of the logical level "0". The switch 29 supplies the current from the switch 28 to the adder 25, only when the apparatus is in the recording mode.

The adder 25 adds the current passed through the switch 29 and the bottom power current supplied from the bottom power current source 24, and then supplies a laser diode driving current corresponding to the resultant summed current to LD 31.

As shown in FIG. 3, the FMD 32, the bottom level holding circuit 21, the subtracter 22, the equalizer amplifier 23, the bottom power current source 24, and the adder 25 are assembled together to form a bottom power servo control circuit for the laser diode driving current.

The bottom power servo control circuit calculates the difference between the target bottom level $V_B$ and the actual bottom level $V_B$ of the optical power detection signal detected in the FMD 32 to set the difference as an error signal. In the bottom power servo control circuit, the bottom power $P_B$ of the LD 31 is kept at the target bottom-power $P_{OB}$, by servo controlling the laser diode driving current to be supplied to the LD 31 utilizing the error signal.

However, when it is intended to execute the higher rate recording with higher transmitting rate of the modulated signal, the problem arises that the detection by the FMD 32 is not able to speed up as quickly as the higher rate recording. Thus, the waveform of the optical power detection signal from the FMD 32 becomes blunt as shown in FIG. 4. In other words, though the bottom power $P_B$ of the laser beam irradiated by the LD 31 equals to the target bottom power $P_{OB}$, the bottom level $V_B$ of the optical power detection signal detected by the FMD 32 can not fall down to the desired bottom level $V_{OB}$. As a result, as shown in FIG. 4, a bottom power detecting error $\Delta G$ is generated, so that the bottom power servo circuit will treat the bottom power detecting error $\Delta G$ as an error signal. As a result, the servo control will be executed in the manner that the bottom power $P_B$ is decreased by $\Delta G$.

In other words, in spite of an stable condition that the bottom power $P_B$, of the laser beam equals to the desired bottom power $P_{OB}$, the servo control for decreasing the bottom power $P_B$ is performed.

Described above, the increase of the transmission rate of modulated signals for the recording at higher rate causes the problem in which the bottom power of the laser beam is falling down below the desired level. Thus, the accuracy for the servo control may become coarse, or it may happens that the laser beam is disappeared.

The object of the invention is to solve the above problems, and to provide a laser diode driving apparatus in which the bottom power of a laser beam for the recording is stably kept at a target value during higher rate recording operation.

SUMMARY OF THE INVENTION

The foregoing and other problems are overcome by a laser diode driving apparatus according to the present invention. The laser diode driving apparatus is provided in an optical information recording and reproducing apparatus including a laser diode for irradiating a laser beam for the recording and reproducing onto an optical recording medium, said laser diode driving apparatus comprising: peak power setting means for setting an optimum optical peak power for the information recording on said optical recording medium, means for generating a bottom power corrected value depending on said optical peak power, adding means for adding a target bottom level corresponding to a target bottom power and said bottom power corrected value to set the summed value as a corrected target bottom level, optical detecting means for generating an optical power detection signal depending on the optical power of said laser beam, bottom level detecting means for detecting the bottom level of said optical power detection signal to obtain a detected bottom level, subtracting means for subtracting said detected bottom level from said corrected target bottom level to provide a signal corresponding to the resultant remaining value as an error signal, and means for adjusting the bottom power of the laser beam emitted from said laser diode on the basis of said error signal.

The laser diode driving apparatus according to the present invention in an optical information recording and reproducing apparatus acquires a bottom power corrected value depending on the peak power of a laser beam for the information recording and reproducing, subtracts the bottom level of an optical power detection signal detected by a front monitoring diode from a corrected target bottom power obtained by adding the bottom power corrected value and a target bottom power to set a resultant remaining value as an error signal, and adjusts the bottom power of a laser beam from the laser diode on the basis of the error signal.

BRIEF EXPLANATION OF THE DRAWINGS

The above set forth and other features of the invention are made more apparent in the ensuring Detailed Description of the Invention read in conjunction with the attached Drawings, wherein:

FIG. 5 is a diagram showing a LD driving circuit 20' according to the present invention and a recording and reproducing head 30.

DETAILED DESCRIPTION OF THE PREFERRED EMBODIMENTS

Figure 1:
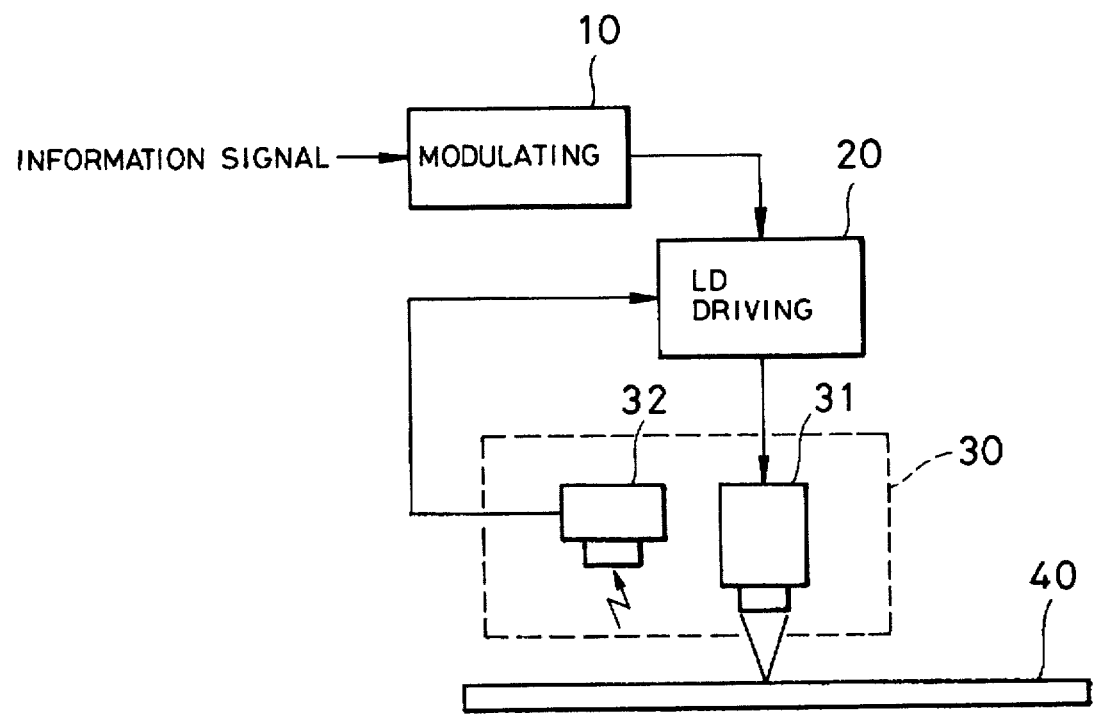
FIG. 1 is a schematic diagram showing an information recording system in an optical information recording and reproducing apparatus.
Figure 2:
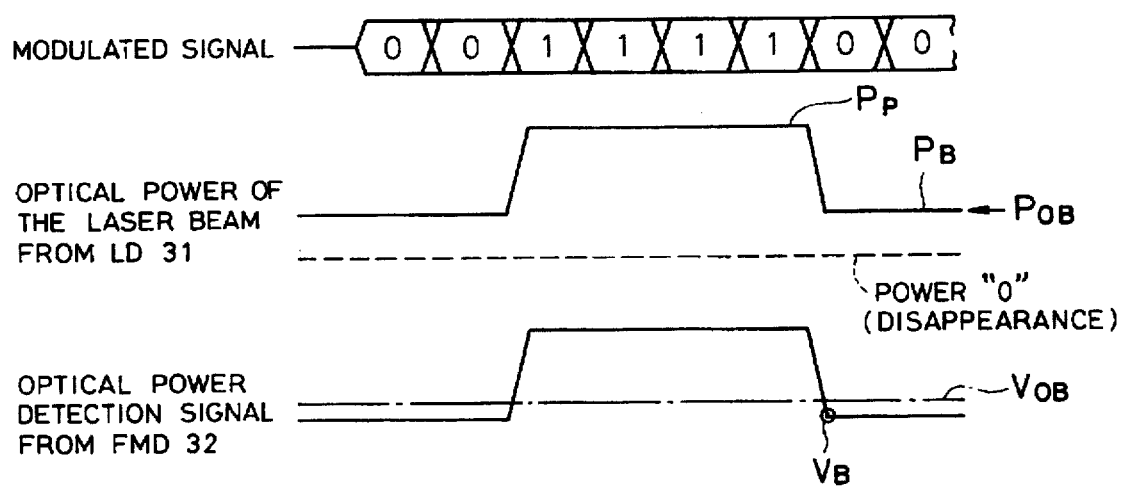
FIG. 2 is a view illustrating the operation of the LD 31 and the FMD 32.
Figure 3:
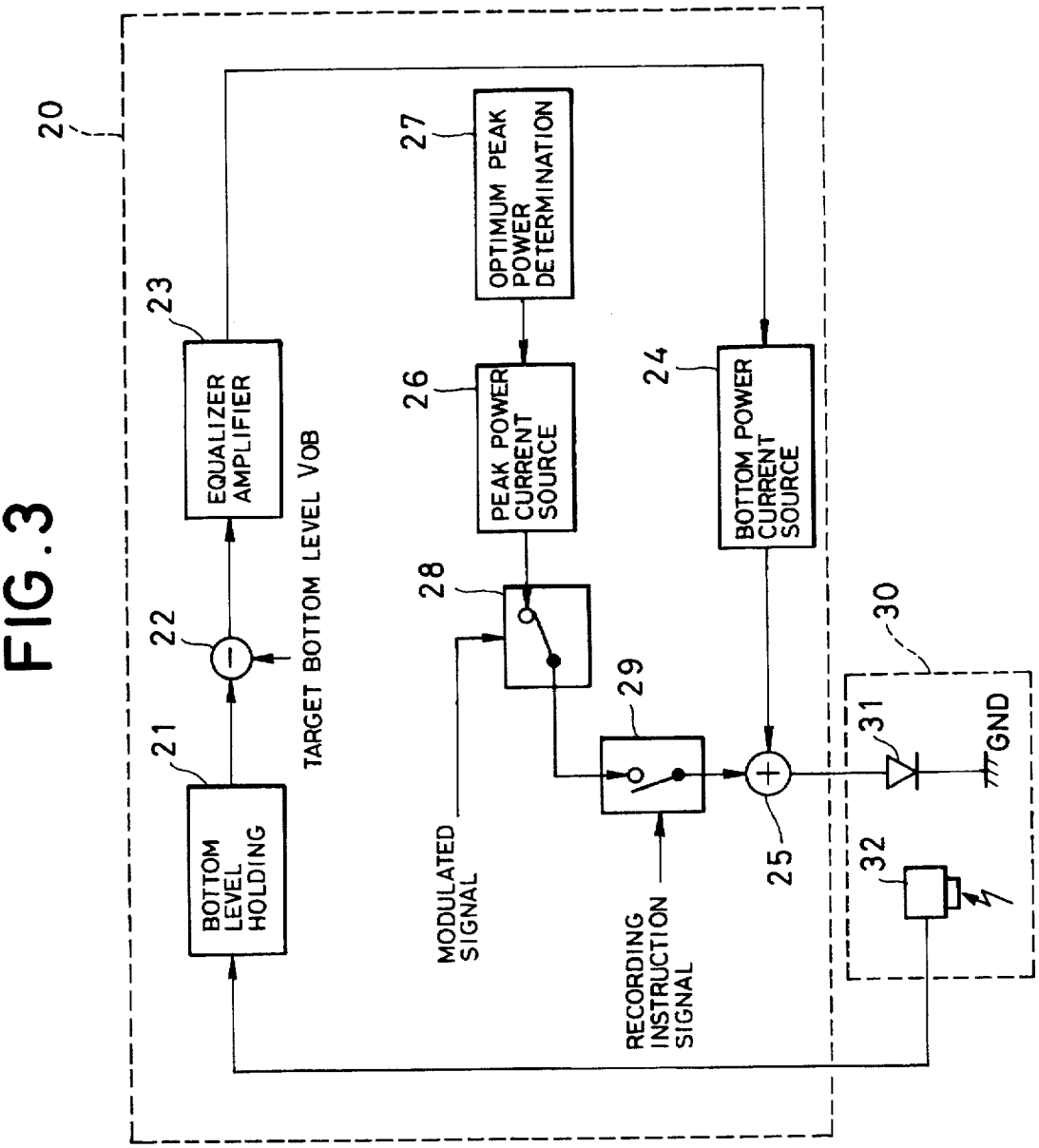
FIG. 3 is a diagram showing a conventional LD driving circuit 20 and a recording and reproducing head 30.

Detailed description of the preferred embodiments according to the present invention is made in conjunction with FIG. 5.

Referring to FIG. 5, a recording and reproducing head 30 includes a laser diode (LD) 31 for irradiating a laser beam for the recording and reproducing onto an optical disk as an optical recording medium. The head 30 further includes a front monitoring diode (FMD) 32 for detecting a divided light which is divided by a beam splitter and for generating an optical power detection signal having the level dependent on the optical power in the divided light.

A bottom level holding circuit 21 detects and holds the lower limit (bottom level) of the an optical power detection signal supplied from the FMD 32, and then supplies the detected bottom level as a detected bottom level $V_B$ to a subtracter 22. The subtracter 22 subtracts the detected bottom level $V_B$ from a target bottom level supplied from a selector 41 described below to supply a signal corresponding to the remaining value as an error signal to an equalizer amplifier 23. The equalizer amplifier 23 compensates the phase of the error signal to supply the compensated error signal to a bottom power current source 24.

The bottom power current source 24 generates the specific amount of bottom power current corresponding to the summed level of a predetermined basic bottom level and the level of the compensated error signal to supply the bottom power current to an adder 25. A peak power current source 26 generates the specific amount of peak power current corresponding to the level of a peak power signal supplied from an optimum peak power determining circuit 27' described below to supply the peak power current to an input terminal of a switch 28.

The optimum peak power determining circuit 27' determines the optimum peak power of the laser beam being irradiated on an optical disk prior to recording the information signals on the optical disk.

In a preferred embodiment, the optimum peak power determining circuit 27' initially records information signals for determination on an optical disk, varying incrementally or decrementally the level of a peak power signal supplied to the peak power current source 26. Then, the information signals for determination is reproduced, and then the most accurately reproduced information signal is determined. In the optimum peak power determining circuit 27', the peak power signal which had been supplied to the peak power current source 26 when the most accurately reproduced information signal was recorded is set as the optimum peak power. Utilizing the optimum peak power determining circuit 27', the initial condition for the LD driving circuit 20' is set in the manner that the information recording is executed using an optimum peak power dependent of each of the characteristics of optical disks.

The optimum peak power determining circuit 27' then supplies the optimum peak power signal corresponding to the determined optimum peak power to a coefficient multiplier 42. The optimum peak power determining circuit 27' also subtracts the basic bottom level (which has been predetermined in the bottom power current supply 24) from the determined optimum peak power signal to supply the signal corresponding to the resultant remaining value as a peak power signal to the peak power current source 26.

The coefficient multiplier 42 multiplies the optimum peak power signal by a predetermined coefficient K to take the resultant product as a bottom power corrected value, and then supplies the bottom power corrected value to an adder 43. The adder 43 adds the bottom power corrected value and a target bottom level $V_{OB}$ to supply the resultant summed value as a corrected target bottom level to one input terminal "a" of the selector 41. To the other input terminal "b" of the selector 41, the target bottom level $V_{OB}$ is supplied. The selector 41 supplies a corrected target bottom level which has been supplied at the input "a" as a target bottom level to the subtracter 22, if a recording instruction signal supplied to a switching controlling terminal has the logical value "1". While, the selector 41 supplies the target bottom level $V_{OB}$ which has been supplied to the input "b" as the target bottom level to the subtracter 22, if a recording instruction signal has another logical value "0". It should be understood that the recording instruction signal is supplied from a CPU (central processing unit; not shown) for controlling all operations in the optical information recording and reproducing apparatus.

In a recording mode in which the optical information recording and reproducing apparatus records information on an optical disk, the CPU generates one instruction signal having the logical value "1". While, in a reproducing mode, the CPU generates the other instruction signal having the logical value "0".

Accordingly, when the optical information recording and reproducing apparatus takes the reproducing mode, the selector 41 supplies the target bottom level $V_{OB}$ itself as the target bottom level to the subtracter 22. While, the optical information recording and reproducing apparatus takes the recording mode, because the target bottom level $V_{OB}$ is added with the bottom power corrected value which has been obtained by multiplying the optimum peak power signal by the predetermined coefficient K, and then the selector 41 supplies the summed value from the adder 43 as a target bottom level to the subtracter 22.

The peak power current source 26 generates the specific amount of peak power current corresponding to the level of a peak power signal supplied from the optimum peak power determining circuit 27' to supply the peak power current to an input terminal of the switch 28. The switch 28 is turned on if an information modulated signal has the logical value of "1", while the switch 28 is turned off if an information modulated signal has the logical value of "0". In other words, the switch 28 supplies the peak power current supplied from the peak power current source 26 to a subsequent switch 29, only when the logical value of the information modulated signal which has been supplied to a switching controlling terminal of the switch 29 equals to "1".

The switch 29 is turned on if an instruction signal supplied to a switching controlling terminal has the logical value "1", while the switch 29 is turned off if the instruction signal has the logical value of "0". In other words, the switch 29 supplies the current passed through the switch 28 to the adder 25, only when the logical value of an instruction signal supplied to the switching controlling terminal equals to "1". Thus, when the optical information recording and reproducing apparatus takes the recording mode, the switch 29 supplies the peak power current supplied from the peak power current source 26 to the adder 25. While, the optical information recording and reproducing apparatus takes the reproducing mode, the peak power current supplied from the peak power current source 26 is not supplied to the adder 25, but the bottom power current supplied from the bottom power current source 24 is supplied to the adder 25.

The adder 25 adds the current passed through the switch 29 and the bottom power current supplied from the bottom power current source 24 to supply the summed current as a laser diode driving current to the LD 31. The LD 31 irradiates a laser beam which has the specific amount of optical power corresponding to the laser diode driving current onto an optical disk as a recording medium.

As shown in FIG. 5, the FMD 32, the bottom level holding circuit 21, the subtracter 22, the equalizer amplifier 23, the bottom power current source 24, and the adder 25 are assembled together to form a bottom power servo controlling circuit for the laser diode driving current.

In the bottom power servo controlling circuit, an error signal is obtained by subtracting the actual bottom level $V_B$ of the optical power detection signal detected at the FMD 32 from the target bottom level. The bottom power servo controlling circuit adjusts the bottom power $P_B$ to be hold at the target bottom power $P_{OB}$ by servo controlling the laser diode driving current being supplied to the LD 31.

In the preferred embodiment, when the apparatus takes the recording mode, the structure including the selector 41, the coefficient multiplier 42, and the adder 43 adds the target bottom level $V_{OB}$ which is fixed and the bottom power corrected value, and then sets the resultant summed level as the target bottom level. It should be noticed that the bottom power corrected value is obtained by multiplying an optimum peak power signal determined by the optimum peak power determination circuit 27' by the predetermined coefficient K.

Thus, the applicant found out that the more the peak power $P_p$ of the laser beam irradiated from the LD 31 increases, the larger the value of the bottom power detected error ΔG is, so that the structure may be conceived by which the bottom power detected error ΔG as a bottom power corrected value is added with the target bottom level $V_{OB}$ to obtain a final target bottom level.

Figure 4:
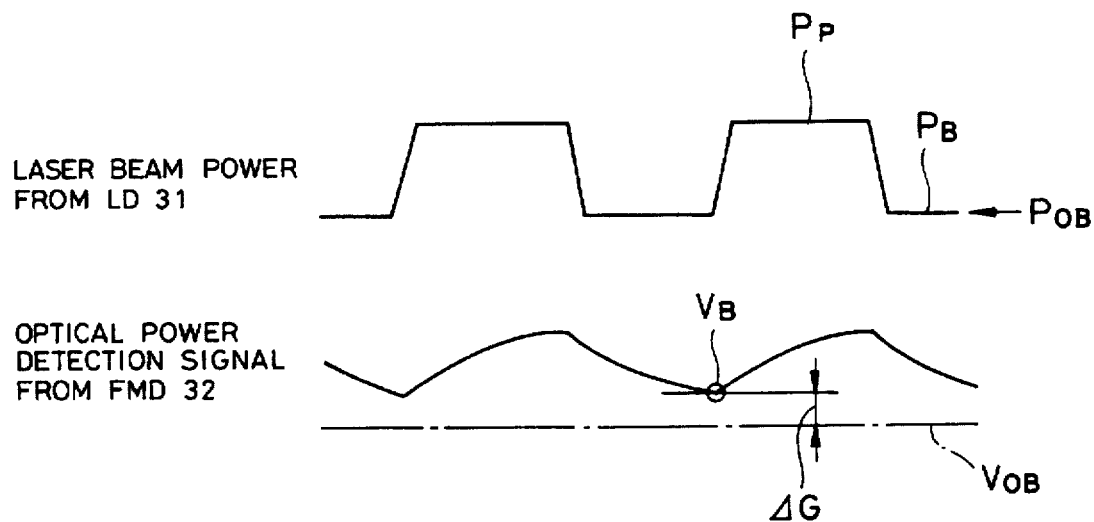
FIG. 4 is a view illustrating the operation of the LD 31 and the FMD 32.

Referring to FIG. 4, the target bottom level $V_{OB}$ is added with the bottom power detected error ΔG, so that the resultant summed level may be supplied to the subtracter 22 as the final target bottom level.

Thus, if the performance of high rate recording causes the bottom level $V_B$ of the optical power detected signal $V_B$ to discord with the target bottom level $V_{OB}$ in spite of the stable condition in which the bottom power $P_B$ equals to the target bottom power $P_{OB}$, an error signal supplied from the subtracter 22 equals to "0", and then the stable condition is maintained.

Described above, the optical information recording and reproducing apparatus according to the present invention obtains the bottom power corrected value by multiplying the peak power of the laser beam for the information recording and reproducing by a predetermined coefficient, then subtracts the bottom level of the optical power detection signal which has detected by the front monitoring diode from the corrected target bottom power obtained by adding the bottom power corrected value and the target bottom power to set the resultant remaining value an error signal, and then adjusts the bottom power of the laser beam from the laser diode on the basis of the error signal.

Thus, one of the effective advantages of the present invention is that the bottom power of the laser beam for the information recording and reproducing may be stably maintained at the target bottom power during the higher rate recording operation, so that an accurate servo control is maintained.

Thus, while the invention has been particularly shown and described with respect to a preferred embodiment thereof, it will be understood by those skilled in the art that changes in form and details may be made therein without departing from the scope and spirit of the invention.

What is claimed is:

1. A laser diode driving apparatus in a information recording and reproducing system including a laser diode for irradiating a laser beam for the recording and reproducing onto an optical recording medium, said apparatus comprising:

peak power setting means for setting an optimum optical peak power for the information recording on said optical recording medium, means for generating a bottom power corrected value depending on said optical peak power, adding means for adding a target bottom level corresponding to a target bottom power and said bottom power corrected value to set the summed value as a corrected target bottom level, optical detecting means for generating an optical power detection signal depending on the optical power of said laser beam, bottom level detecting means for detecting the bottom level of said optical power detection signal to obtain a detected bottom level, subtracting means for subtracting said detected bottom level from said corrected target bottom level to provide a signal corresponding to the resultant remaining value as an error signal, and means for adjusting the bottom power of the laser beam emitted from said laser diode on the basis of said error signal.

2. The laser diode driving apparatus according to claim 1, wherein if the optical information recording and reproducing apparatus is in a recording mode, said subtracting means subtracts said detected bottom level from said corrected target bottom level to set a signal corresponding to the resultant remaining value as said error signal, if the optical information recording and reproducing apparatus is in a reproducing mode, said subtracting means subtracts said detected bottom level from the target bottom level to set a signal corresponding to the resultant remaining value as said error signal.

3. The laser diode driving apparatus according to claim 1, wherein said bottom power corrected value is obtained by multiplying a signal corresponding to the level of the optical power by a coefficient, said optical power having been set by the peak power setting means.

* * * * *